(12) United States Patent
Teixeira (10) Patent No.: US 11,144,438 B1
(45) Date of Patent: Oct. 12, 2021

(54) INCREMENTAL BUILD SYSTEM USING AN INFERRED DEPENDENCY GRAPH COLLECTED WITH A SYSTEM MONITOR

(71) Applicant: YOURBASE INC., Redmond, WA (US)

(72) Inventor: Yves Junqueira Marques Teixeira, Woodinville, WA (US)

(73) Assignee: YOURBASE INC., Redmond, WA (US)

( * ) Notice: Subject to any disclaimer, the term of this patent is extended or adjusted under 35 U.S.C. 154(b) by 0 days.

(21) Appl. No.: 16/694,852

(22) Filed: Nov. 25, 2019

Related U.S. Application Data (60) Provisional application No. 62/771,476, filed on Nov. 26, 2018.

(51) Int. Cl.
| | | |
|---|---|---|
| G06F 11/14 | (2006.01) | |
| G06F 9/44 | (2018.01) | |
| G06F 8/71 | (2018.01) | |
| G06F 11/36 | (2006.01) | |
| G06F 8/41 | (2018.01) | |
| G06F 8/70 | (2018.01) | |
| G06F 8/65 | (2018.01) | |
| G06F 9/54 | (2006.01) | |
| G06F 9/50 | (2006.01) | |

(52) U.S. Cl.
CPC .......... *G06F 11/3688* (2013.01); *G06F 8/433* (2013.01); *G06F 8/71* (2013.01); *G06F 8/41* (2013.01); *G06F 8/447* (2013.01); *G06F 8/65* (2013.01); *G06F 8/70* (2013.01); *G06F 9/5072* (2013.01); *G06F 9/544* (2013.01); *G06F 11/36* (2013.01)

(58) Field of Classification Search
CPC ............ G06F 16/1873; G06F 16/1752; G06F 9/5038; G06F 9/5072; G06F 9/544; G06F 9/44505; G06F 8/71; G06F 8/41; G06F 8/447; G06F 8/65; G06F 11/36
See application file for complete search history.

(56) References Cited

U.S. PATENT DOCUMENTS

| | | | | |
|---|---|---|---|---|
| 7,168,064 | B2 * | 1/2007 | Ousterhout | G06F 8/41 |
| | | | | 717/120 |
| 7,721,272 | B2 * | 5/2010 | Mockford | G06F 8/71 |
| | | | | 717/140 |

(Continued)

OTHER PUBLICATIONS

Sebastian Erdweg et al., A Sound and Optimal Incremental Build System with Dynamic Dependencies, Oct. 25-30, 2015, [Retrieved on Jun. 29, 2021], Retrieved from the internet: <URL: https://dl.acm.org/doi/pdf/10.1145/2858965.2814316> 18 Pages (89-106) (Year: 2015).*

(Continued)

*Primary Examiner* — Anibal Rivera
(74) *Attorney, Agent, or Firm* — Wilson Sonsini Goodrich & Rosati (57) ABSTRACT

Disclosed are servers, software, systems, media, and methods for performing automated software tests by executing incremental software builds that skip unnecessary steps based at least in part on a dependency graph generated via tracking system calls during an initial software build, discovering dependencies based on resources accessed, and correlating dependencies with steps of the initial software build.

38 Claims, 9 Drawing Sheets

(56) References Cited

U.S. PATENT DOCUMENTS

| | | | | |
|---|---|---|---|---|
| 7,797,689 | B2* | 9/2010 | Mockford | G06F 8/71 717/151 |
| 8,510,342 | B1* | 8/2013 | Yang | G06F 8/71 707/798 |
| 8,850,391 | B1* | 9/2014 | Lin | G06F 8/71 717/121 |
| 9,442,707 | B2* | 9/2016 | Sathyanathan | G06F 8/41 |
| 9,632,769 | B2* | 4/2017 | Arnott | G06F 8/71 |
| 1,006,157 | A1 | 8/2018 | Melski | |
| 10,061,577 | B2* | 8/2018 | Melski | G06F 9/4881 |
| 1,019,192 | A1 | 1/2019 | Meacham et al. | |
| 10,191,926 | B2* | 1/2019 | Meacham | G06F 16/1873 |
| 10,210,170 | B2* | 2/2019 | Kuhtz | G06F 8/71 |
| 10,891,570 | B2* | 1/2021 | Tran | G06Q 10/06316 |
| 2003/0018694 | A1* | 1/2003 | Chen | H04L 67/34 709/200 |
| 2003/0037173 | A1* | 2/2003 | Pace | H04L 67/2823 719/310 |
| 2003/0050932 | A1* | 3/2003 | Pace | G06Q 10/10 |
| 2003/0074207 | A1* | 4/2003 | Pace | H04L 69/329 709/204 |
| 2003/0074360 | A1* | 4/2003 | Chen | H04L 67/10 |
| 2003/0078958 | A1* | 4/2003 | Pace | G06F 9/544 709/201 |
| 2003/0084134 | A1* | 5/2003 | Pace | H04L 69/40 709/223 |
| 2004/0194060 | A1* | 9/2004 | Ousterhout | G06F 9/5072 717/120 |
| 2010/0262948 | A1* | 10/2010 | Melski | G06F 9/44505 717/101 |
| 2011/0239195 | A1* | 9/2011 | Lin | G06F 8/71 717/126 |
| 2012/0079447 | A1* | 3/2012 | Arnott | G06F 8/71 717/101 |
| 2013/0091252 | A1* | 4/2013 | Pizzorni | H04L 69/329 709/219 |
| 2016/0103677 | A1* | 4/2016 | Melski | G06F 9/5038 717/120 |
| 2018/0218005 | A1* | 8/2018 | Kuhtz | G06F 16/1752 |
| 2019/0205110 | A1* | 7/2019 | Liu | G06F 8/71 |
| 2020/0004528 | A1* | 1/2020 | Pape | G06F 8/71 |

OTHER PUBLICATIONS

Viet Hung Nguyen et al., Predicting Vulnerable Software Components with Dependency Graphs, Sep. 15, 2010, [Retrieved on Jun. 29, 2021], Retrieved from the internet: <URL: https://dl.acm.org/doi/abs/10.1145/1853919.1853923> 8 Pages (1-8) (Year: 2010).*

* cited by examiner

INCREMENTAL BUILD SYSTEM USING AN INFERRED DEPENDENCY GRAPH COLLECTED WITH A SYSTEM MONITOR

CROSS-REFERENCE TO RELATED APPLICATIONS

This application claims the benefit of U.S. Application Ser. No. 62/771,476, filed Nov. 26, 2018, which is hereby incorporated by reference in its entirety.

BACKGROUND OF THE INVENTION

Build systems are used to automate the compilation and assembly of programs, also to automate the execution of tests. These systems are capable of doing incremental builds quickly by caching the actions from previous builds. This caching is more effective when different sections of the build process are cached. For caching to be effective and correct, the system needs to understand all the dependencies of the software being built, so it can identify pieces that must be rebuilt or retested.

SUMMARY OF THE INVENTION

Existing incremental build systems that use an explicit dependency graph require excessive maintenance by users to keep the dependency graph up to date. Current systems that rely on an implicit graph are fragile and incomplete, so they are not able to deliver ease of use, reliability, and high performance at the same time.

The invention discovers all dependencies of a software project by tracking system calls during a full build based on a high-level build script. It correlates these dependencies with build steps and generates a complete dependency graph. This complete dependency graph is used in future builds to skip unnecessary steps, complete the operation much faster and using fewer resources.

In one aspect, disclosed herein are computer-implemented systems comprising a digital processing device comprising at least one processor, an operating system configured to perform executable instructions, a memory, and a computer program including instructions executable by the digital processing device to create a software build configured to run automated tests comprising: a software module receiving an software build script; a software module executing the software build script to conduct an initial software build; a software module tracking system calls during the initial software build, discovering dependencies based on resources accessed by the system calls, and correlating dependencies with steps of the initial software build to generate recorded data; a software module automatically generating a complete dependency graph using at least the recorded data; a software module receiving an incremental software build request; and a software module executing the incremental software build skipping unnecessary steps based on at least the complete dependency graph. In some embodiments, the recorded data comprises metadata about the initial software build. In further embodiments, the metadata about the initial software build comprises one or more of: the software being built, the repository being used, the commit identification, and the variables present in the environment. In some embodiments, the recorded data comprises artifacts of the initial software build. In further embodiments, the artifacts of the initial software build comprise one or more of: compiled binary code, bundled archives, test results, object files, and generated files. In some embodiments, the recorded data comprises events that occurred during the initial software build. In further embodiments, the events that occurred during the initial software build comprises one or more of: files read or modified, sub-processes started, and network resources accessed. In a particular embodiment, the recorded data comprises: metadata about the initial software build; artifacts of the initial software build; and events that occurred during the initial software build. In some embodiments, the software module discovering dependencies discovers the dependencies by inference based on the resources accessed by the system calls. In some embodiments, the incremental software build is conducted without a user-generated explicit dependency graph. In some embodiments, the incremental software build is conducted at least 2× faster than the initial software build. In further embodiments, the incremental software build is conducted at least 3× faster than the initial software build. In some embodiments, the complete dependency graph is not manually updated or corrected.

In another aspect, disclosed herein are non-transitory computer-readable storage media encoded with a computer program including instructions executable by a processor to create a software build configured to run automated tests comprising: a software module receiving an software build script; a software module executing the software build script to conduct an initial software build; a software module tracking system calls during the initial software build, discovering dependencies based on resources accessed by the system calls, and correlating dependencies with steps of the initial software build to generate recorded data; a software module automatically generating a complete dependency graph using at least the recorded data; a software module receiving an incremental software build request; and a software module executing the incremental software build skipping unnecessary steps based on at least the complete dependency graph. In some embodiments, the recorded data comprises metadata about the initial software build. In further embodiments, the metadata about the initial software build comprises one or more of: the software being built, the repository being used, the commit identification, and the variables present in the environment. In some embodiments, the recorded data comprises artifacts of the initial software build. In further embodiments, the artifacts of the initial software build comprise one or more of: compiled binary code, bundled archives, test results, object files, and generated files. In some embodiments, the recorded data comprises events that occurred during the initial software build. In further embodiments, the events that occurred during the initial software build comprises one or more of: files read or modified, sub-processes started, and network resources accessed. In a particular embodiment, the recorded data comprises: metadata about the initial software build; artifacts of the initial software build; and events that occurred during the initial software build. In some embodiments, the software module discovering dependencies discovers the dependencies by inference based on the resources accessed by the system calls. In some embodiments, the incremental software build is conducted without a user-generated explicit dependency graph. In some embodiments, the incremental software build is conducted at least 2× faster than the initial software build. In further embodiments, the incremental software build is conducted at least 3× faster than the initial software build. In some embodiments, the complete dependency graph is not manually updated or corrected.

In yet another aspect, disclosed herein are computer-implemented methods of running automated software tests comprising: receiving, by a build server, a software build script; executing, by the build server, the software build script to conduct an initial software build; tracking, by the build server, system calls during the initial software build, discovering dependencies based on resources accessed by the system calls, and correlating dependencies with steps of the initial software build to generate recorded data; automatically generating, by the build server, a complete dependency graph using at least the recorded data; receiving, by the build server, an incremental software build request; and executing, by the build server, the incremental software build skipping unnecessary steps based on at least the complete dependency graph. In some embodiments, the recorded data comprises metadata about the initial software build. In further embodiments, the metadata about the initial software build comprises one or more of: the software being built, the repository being used, the commit identification, and the variables present in the environment. In some embodiments, the recorded data comprises artifacts of the initial software build. In further embodiments, the artifacts of the initial software build comprise one or more of: compiled binary code, bundled archives, test results, object files, and generated files. In some embodiments, the recorded data comprises events that occurred during the initial software build. In further embodiments, the events that occurred during the initial software build comprises one or more of: files read or modified, sub-processes started, and network resources accessed. In a particular embodiment, the recorded data comprises: metadata about the initial software build; artifacts of the initial software build; and events that occurred during the initial software build. In some embodiments, discovering dependencies comprises inferring the dependencies based on the resources accessed by the system calls. In some embodiments, the incremental software build is conducted without a user-generated explicit dependency graph. In various embodiments, the incremental software build is conducted at least 2×, at least 3×, at least 5×, or at least 10× faster than the initial software build. In some embodiments, the complete dependency graph is not manually updated or corrected by a user.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Previous solutions are not able to run incremental builds at a high rate because they do not provide a mechanism for chaining build images efficiently. In practice, incremental builds could only be started from full build images, and not from other incremental images. This greatly reduces the usability of those solutions because the images would either lag behind, not getting updated after new builds, or a full build had to be started frequently in the background.

The goal of the system described herein is to provide fast incremental builds based on images that have few differences compared to the code being built. To achieve this goal, the system provides an efficient method of versioning filesystem images that hold the artifacts of each build, independently, and has a large number of images available to be used for new software builds. Having many such candidate images lowers the delta for a build. When a full build is run, it creates an image. That image is stored and is available for future builds. The next build uses the image as the starting filesystem. At the end of this second build (an incremental build), another image should be created. Eventually a third build will be started based on the second image. This creates a chain of filesystem layers, e.g., B1=>B2=>B3. In one embodiment, a layering filesystem (such as overlayfs or btrfs) is used to keep different stackable filesystem layers accessible by the build system for a particular source repository.

Multiple layers are kept for each repository because when a new build is started, the system should pick one of the images B1, B2, or B3, whatever leads to the smallest incremental build. The layering filesystem is able to keep multiple layers with a low space overhead because each layer only has the additional data for that layer, avoiding unnecessary redundancy and keeping space usage more efficient. But, over time, more and more users create builds for the repository, so the number of such layers grows to, for example, dozens of layers. Too many layers causes a performance degradation because the system has to read through several filesystem layers (which are separate pieces of data in the storage media). So it is important that the churn of layers is managed carefully. It must, at the same time, allow the usage of fresh build for efficient incremental builds and avoid incurring an excessive cost in IO time or latency. To solve this challenge, we use multiple strategies: 1) distributing the build stacks into different independent servers with their own image layers for a given repo. This reduces the churn in one particular stack of layers, while also providing load-balancing for other aspects of the server (CPU, RAM); 2) squashing or compacting of layers when they hit a certain depth threshold, like done by Bigtable's SSTable approach; 3) keeping the rate of layer creation as efficient as possible (e.g., only add one layer for every incremental build); and 4) as an alternative to squashing layers, running a fresh full build using a recent commit and storing it as a new base image, discarding previous ones. The end result is a system that efficiently and quickly builds code incrementally based upon a large collection of images generated from previous builds.

In addition to saving images for successive incremental builds, the system also creates a copy of each original image's build dependency index, but with modifications to the graph with regard to steps that have been run on the new build. In other words, the system updates the dependency graph incrementally after each build. If an incremental build runs STEP 1 and it reads only file F1 and writes only to file F2, the build dependency index should indicate that and remove any other resource or file access that was associated with STEP 1.

While the description herein discusses a skipper tool as a stand-alone program that decides if programs should run or be skipped, the same role could be played by a more general, lower-level mechanism, such as alternative implementation of system calls that wrap the original syscalls, but short-circuiting their execution after consulting the dependency graph. For example, a hook or wrapper could be added for the execve(2) system calls. This system call normally loads a new program to be executed, usually after a fork(2). In one embodiment, when an unnecessary build command is started, a wrapper for the execve(2) system call could decide to memoize the execution by returning quickly with a success code, and then immediately issuing an exit(2). Such a design provides an easy-to-use general-purpose caching/skipping of short-lived processes, usable in a large number of scripts or tools.

Described herein, in certain embodiments, are computer-implemented systems comprising a digital processing device comprising at least one processor, an operating system configured to perform executable instructions, a memory, and a computer program including instructions executable by the digital processing device to create a software build configured to run automated tests comprising: a software module receiving an software build script; a software module executing the software build script to conduct an initial software build; a software module tracking system calls during the initial software build, discovering dependencies based on resources accessed by the system calls, and correlating dependencies with steps of the initial software build to generate recorded data; a software module automatically generating a complete dependency graph using at least the recorded data; a software module receiving an incremental software build request; and a software module executing the incremental software build skipping unnecessary steps based on at least the complete dependency graph.

Also described herein, in certain embodiments, are non-transitory computer-readable storage media encoded with a computer program including instructions executable by a processor to create a software build configured to run automated tests comprising: a software module receiving an software build script; a software module executing the software build script to conduct an initial software build; a software module tracking system calls during the initial software build, discovering dependencies based on resources accessed by the system calls, and correlating dependencies with steps of the initial software build to generate recorded data; a software module automatically generating a complete dependency graph using at least the recorded data; a software module receiving an incremental software build request; and a software module executing the incremental software build skipping unnecessary steps based on at least the complete dependency graph.

Also described herein, in certain embodiments, are computer-implemented methods of running automated software tests comprising: receiving, by a build server, an software build script; executing, by the build server, the software build script to conduct an initial software build; tracking, by the build server, system calls during the initial software build, discovering dependencies based on resources accessed by the system calls, and correlating dependencies with steps of the initial software build to generate recorded data; automatically generating, by the build server, a complete dependency graph using at least the recorded data; receiving, by the build server, an incremental software build request; and executing, by the build server, the incremental software build skipping unnecessary steps based on at least the complete dependency graph.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "software build" refers to the process of converting source code into standalone software artifacts that can be run on a computer for testing, execution, or deployment. A software build may also refer to the final forms of that process: test results, executable binaries, or deployable packages.

As used herein, "file" refers to data in the filesystem, including directory entries, i-nodes, file names, and file contents.

As used herein, "resource" refers to an external piece of data or code accessed via IPC or network calls. That includes inter-process communication such as sockets or pipes, network requests over any protocols to any address, including internet addresses, local network addresses or loopback addresses.

As used herein, a "build script," sometimes referred to as a "build configuration," refers to a series of instructions the build system must follow to produce the desired results. The build script is alternatively created manually or generated by a program.

As used herein, "build execution plan" is a subset of the build-script with unnecessary steps filtered out.

Overview

The subject matter disclosed herein includes platforms, systems, media, and methods to build and test software incrementally using a dependency graph that is inferred from previous executions of the build process.

Users create scripts for building and testing the projects. Such scripts are often already part of existing software projects and can be used without modification by this invention.

The system executes the build script and records data during the build execution. The recorded data includes: 1) Metadata about the build operation: what software is getting built, what repository, what commit identification and what variables are present in the environment; 2) Artifacts of the build: every build produces output such as compiled binary code, bundled archives or test results; and 3) Events that occurred within the build system, such as which files were read or modified, which sub-processes were started, and which network resources were accessed.

Whenever an event is recorded, the system also tracks which build steps or sub-steps were associated with that event. A build (sub)step is a node in the build graph. It can be one of the original commands defined by the user's build script, or it can be a sub-command that is a descendant of the original user-defined build script commands.

The events are recorded in the filesystem. They are eventually post-processed and stored in a map where the keys are names of files or variables being changed in the code repository or in the build execution context, and the values are the names of steps that need to be re-run. The data store also records which commands must be re-run for a given build (sub)step.

An incremental build request may be manually submitted by a user directly to the build server API, or through an automated tool.

The build system uses the provided information and its own build data store to determine which build steps should be repeated for the current build and which build output or artifacts are still valid.

Figure 1:
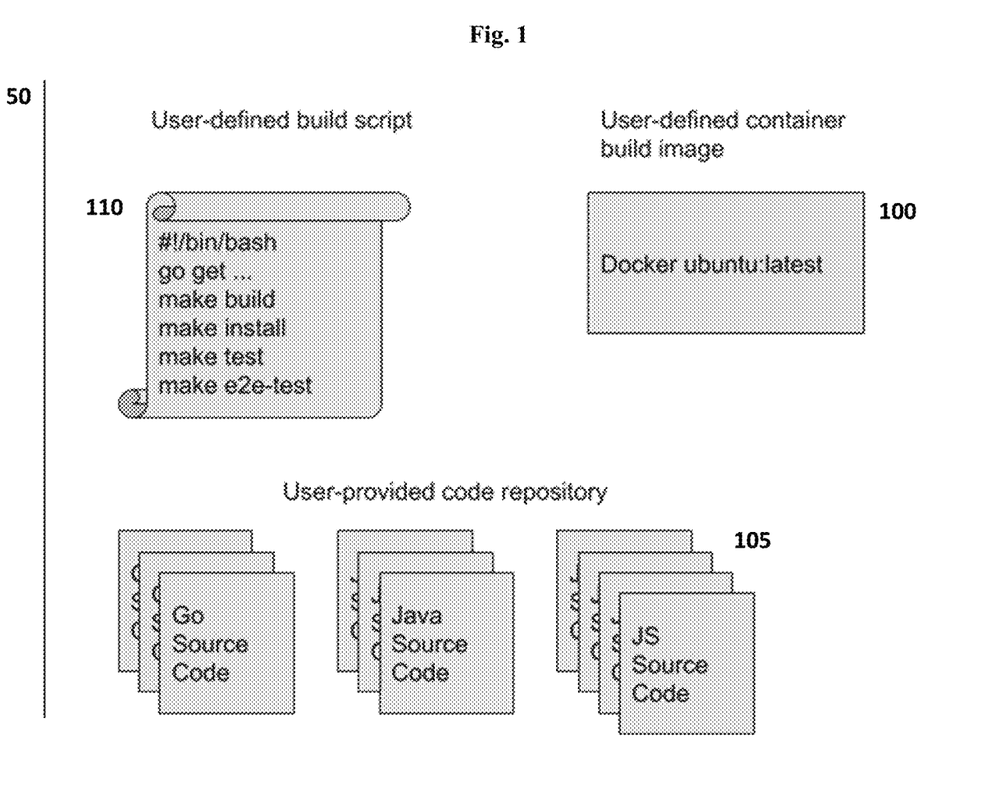
FIG. 1 is a non-limiting example of the information required to build a project and infer its dependency graph.

Referring to FIG. 1, in a particular embodiment, to build a software project it is required that the user provides information in a build request 50: a reference to a container build image 100, a reference to the code repository with access to the code 105 and a build script 110.

The reference to a container build image 100 is an address to a pre-built image hosted in a docker registry. For example, containers.yourbase.io/debian:9 is a reference to a pre-built docker image that contains a Debian server image. In this URL, containers.yourbase.io is the hostname of the docker registry, and debian:9 is a specific image and version that should be downloaded and used during a build.

The reference to the code repository 105 may follow a format understandable by the VCS tool. In the case of git, an example URL is https://github.com/yourbase/skipper.git. The build system must have a means to clone the code from this repository, for example by using a GitHub authentication token that has access to that repository.

A build script 110 is a file that contains steps that must be followed to produce the result desired by the user. The purpose of the build script 110 is to compile software, run tests, assemble release artifacts, or all of the above. It may be written in a scripting language such as Bash, Python, and/or Perl. Alternatively, it may be written as a configuration file such as JSON and YAML, using a structure that the build system understands. An example Bash script is provided in FIG. 1 at 110.

A build request may be manually submitted by a user directly to the build server UI, or through an automated tool that communicates with the build server through an API.

Figure 2:
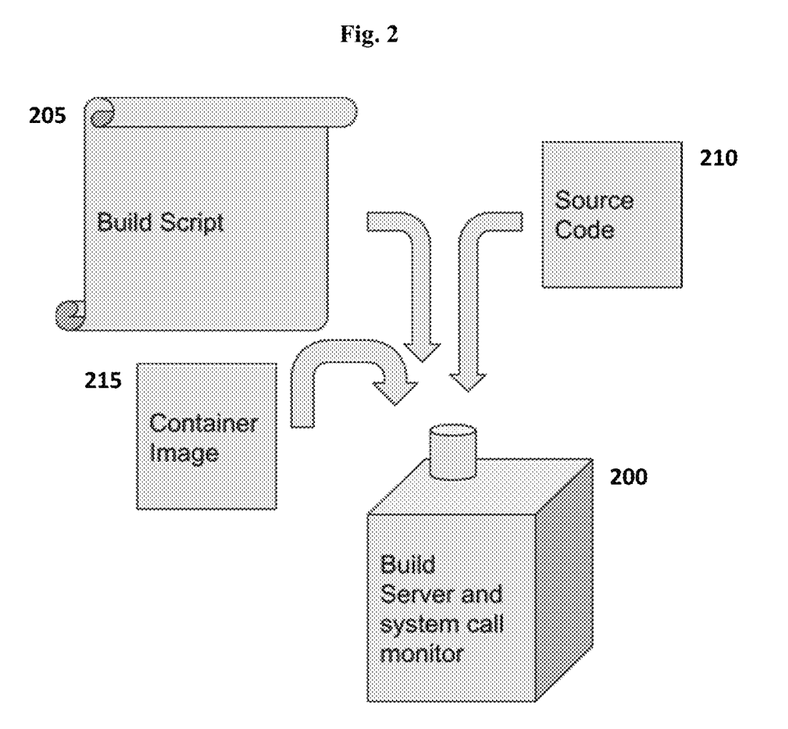
FIG. 2 is a non-limiting example of a build server that receives an initial build request with references to code and a build script, producing build artifacts.

Referring to FIG. 2, in a particular embodiment, the build server 200 is responsible for handling the build requests. A request may be issued by the user to the build server via SSH. SSH handles access control and provides authentication for both the server and the client. If they have the correct credentials (e.g., a private key matching a public key known by the server), the user can issue an SSH command such as:
ssh user@build.yourbase.io yb receive-build--source-commit=3595ef13b85d08187f84986e936f0ab23b46f868--source-repo=philipithomas/moonlight--source-branch=master--build-image=ubuntu:latest--build-script=build.sh The "yb receive-build" command is executed on the build server 200. It clones the repository into a local directory and obtains the build script 205, the repository source code 210 and the appropriate container image 215 for that build.

The first build of a project is a fill build. In this embodiment, the build server executes the commands from the build script 205 inside a freshly-created container with the user-provided container image 215. It may generate a Dockerfile to automate the procedure. If the build request contains the specifications in FIG. 2, the Dockerfile to be generated could be:
FROM ubuntu:latest
RUN git clone git@github.com:philipithomas/moonlight.git
WORKDIR moonlight
RUN git checkout 3595ef13b85d08187f84986e936f0ab23b46f868
RUN bash build.sh This Dockerfile can be then be built with "docker build -t moonlight." If the user provided a build script 205 that works, the docker build process will finish with a success status and an image will be created with the tag moonlight.

Figure 3:
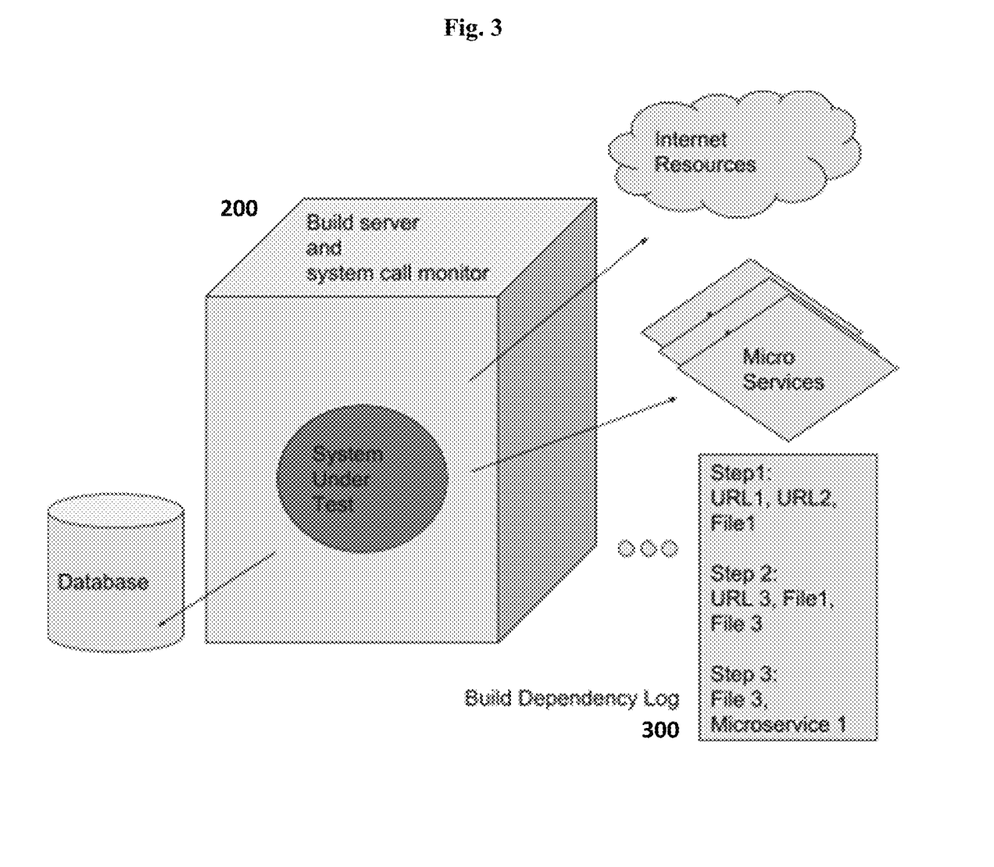
FIG. 3 is a non-limiting example of a process of monitoring the execution of a build to collect a log of dependencies being used, dynamically.

Referring to FIG. 3, in a particular embodiment, a process with sufficient capabilities monitors system calls executed during the build. This monitoring process records: 1) path of files being read; 2) path of files being written to; 3) full commands of processes being started; 4) PID of processes being started; 5) PID of the parent of processes being started.

In this embodiment, the build monitoring information is recorded in a build log 300 with a format shown in Table 1.

TABLE 1

| EXECVE | 26389 | 26388 | cat F1 |
| OPEN | 26389 | 26388 | R cat | 0 /etc/ld.so.cache |
| OPEN | 26389 | 26388 | R cat | 0 /lib/x86_64-linux-gnu/libc.so.6 |
| OPEN | 26389 | 26388 | R cat | 0 F1 |

The format of the lines is not uniform and depends on the particular type of event triggered. The EXECVE event line contains the PID of the new process, the PID of the parent process and the full command arguments of the process being executed.

The OPEN event line contains the PID of the new process, the PID of the parent process, a mode flag indicating if the file is being opened for reads (R) or for writes or read-writes (W) and the error status of the OPEN call.

Figure 4:
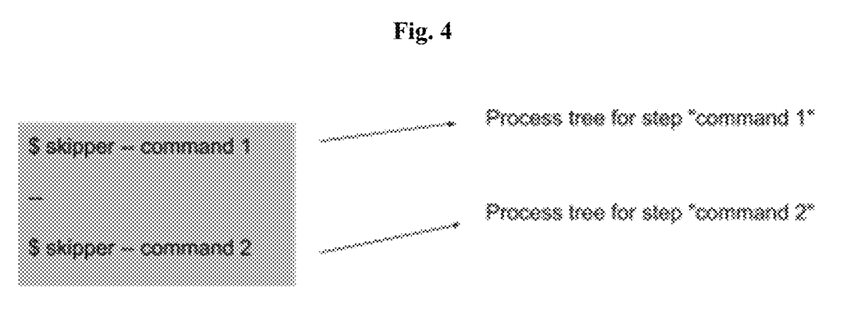
FIG. 4 is a non-limiting example of a tool that can be used in build scripts to memoize build steps.

Referring to FIG. 4, in a particular embodiment, a tool must wrap the execution skippable commands in the build script. This can be done automatically for every command in the build script 205 or manually by the user. The process monitor in FIG. 3 may look for processes that were started by the skipper in order to track only the processes that matter for the dependency graph inference system. The skipper tool has other uses, described separately.

Figure 5:
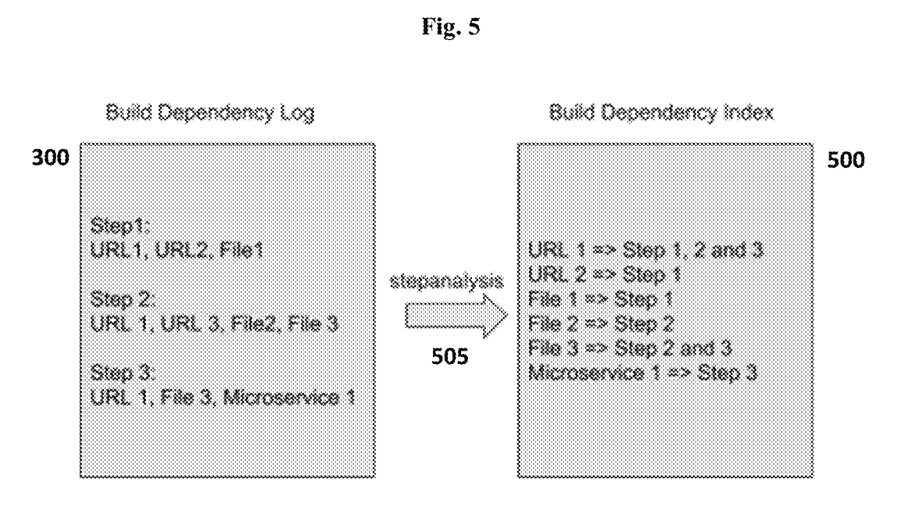
FIG. 5 is a non-limiting example of a dependency log being transformed into a dependency index for fast lookups by file or resource name.

Referring to FIG. 5, in a particular embodiment, the build log 300 must be transformed into a step dependency index 500. The stepanalysis program 505 processes the build log lines to find which resources or files were accessed or changed for each build step and what commands and processes were directly responsible for that. That results in an intermediary data with maps for "path of file being read=>process PID", "path of file being changed=>process PID", "process PID=>command name and arguments" and "process PID=>parent process PID". These four maps can then be used to find what is the skipper step command that is ultimately responsible for a file path access. This data is stored on disk using a fast look-up serialized data format, or an off-the-shelf local storage library such as SQLite.

Figure 6:
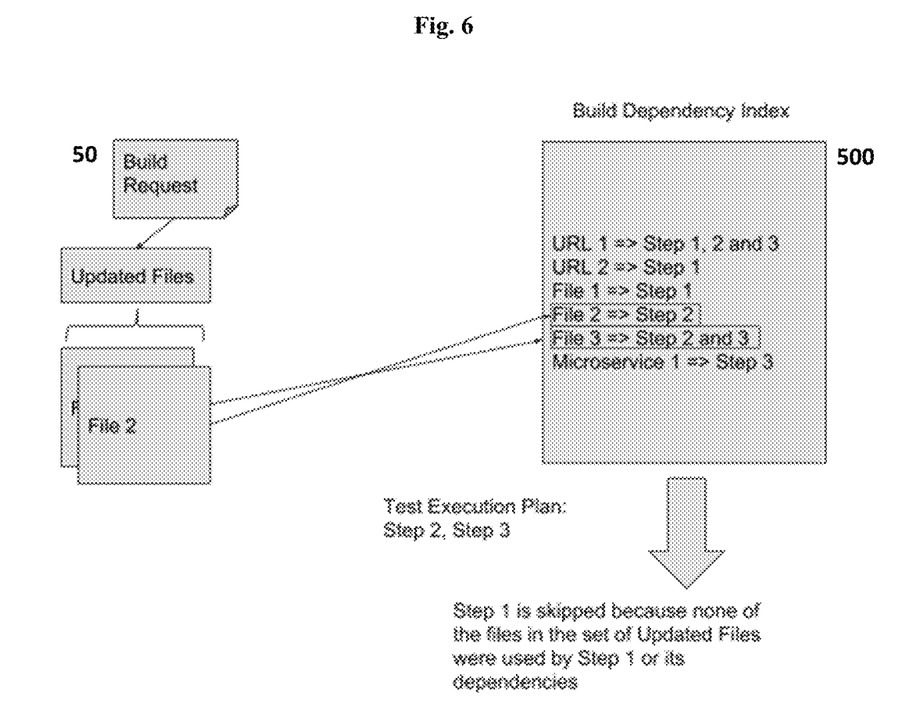
FIG. 6 is a non-limiting example of the process of handling a build request and producing an accelerated build execution.

Referring to FIG. 6, in a particular embodiment, the system must be able to run new builds incrementally by skipping unnecessary steps. It receives a build request 50 containing: 1) metadata about the build operation (described above), which is used to determine which previous build information to look up from the data store, and to find potential dependency graph invalidations (e.g., if an environment variable used by build steps was changed); 2) list of files being changed in the code repository (/changes); and 3) content of files being changed in the code repository (obtainable via git checkout).

A container will be run that uses the previously build image as the base image. For incremental builds, a Dockerfile such as this can be used:
FROM moonlight
RUN git clone git@github.com:philipithomas/moonlight.git
WORKDIR moonlight
RUN git checkout 3595ef13b85d08187f84986e936f0ab23b461868
COPY base-graph/base-graph
COPY base-diff/base-diff
RUN bash build.sh In this embodiment, the build dependency index (the file base-graph in this example) 500 is placed inside the build container before the build starts. The build script execution is triggered and at some point the skipper tool will be invoked, along with the full arguments for running skippable commands. For example, "$ skipper--make install." The skipper opens the build dependency index 500 and the/changes file containing the list of files being changed in the current build.

The skipper uses the build dependency index 500 to decide if the process tree to be started by the current command may eventually read one of the files that are changed for the current build. If the current build changes file F1 and the step "make install" has, at any level of depth in the process tree, any process that reads from F1, then "make install" should be run in this command.

The skipper must also look at indirect dependencies. If F1 is being changed and the make build step uses file F1 to produce file F2, and if "make install" uses F2, the skipper must not skip the execution of make install because it indirectly depends on F1. Pseudo-code:
func IsTransitiveDep(BuildGraph, Step, File) bool:
    for dep in Dependencies(BuildGraph, Step):
if File in dep.UpdatedFiles:
    return true
if IsTransitiveDep(BuildGraph, dep, File):
return true
    return false
func ShouldRunStep(UpdatedFiles, CurrentStep, BuildGraph) bool:
    for file in UpdatedFiles:
if file in UpdatedFiles:
return true
if IsTransitiveDep(BuildGraph, CurrentStep, file):
return true
    return false The skipper can therefore memoize the execution of certain commands because it knows that the current change will not in itself affect the result of the command execution.

The skipper works best when build operations are idempotent. If a build operation produces slightly different results every time it runs, with the skipper those operations will be just skipped so the result will look un-changed every time. This may give a false sense of security to operators that their build operations are idempotent. If for some reason the incremental build system loses its state or has to run a full-build for any reason, one may find that the output of the build has changed. For example, if the build relies on an external resource (e.g., a file behind a public URL) and the user has marked the step as skippable (by prepending "$ skipper--<command>" before the command), that URL will not be re-fetched since the "curl" or "wget" used to fetch it will be skipped and the downloaded file from the previous fetch will be implicitly reused. But if that URL suddenly becomes unavailable, the user may not notice initially. It is a good for the user that the skipper adds resilience and allows them to continue running builds without interrupting their workflow. In this particular embodiment, a separate process can be used to look for non-reproducible builds and warn users of the fragility in their build, giving them the opportunity to fix those issues—but without causing sudden work interruptions.

Figure 9:
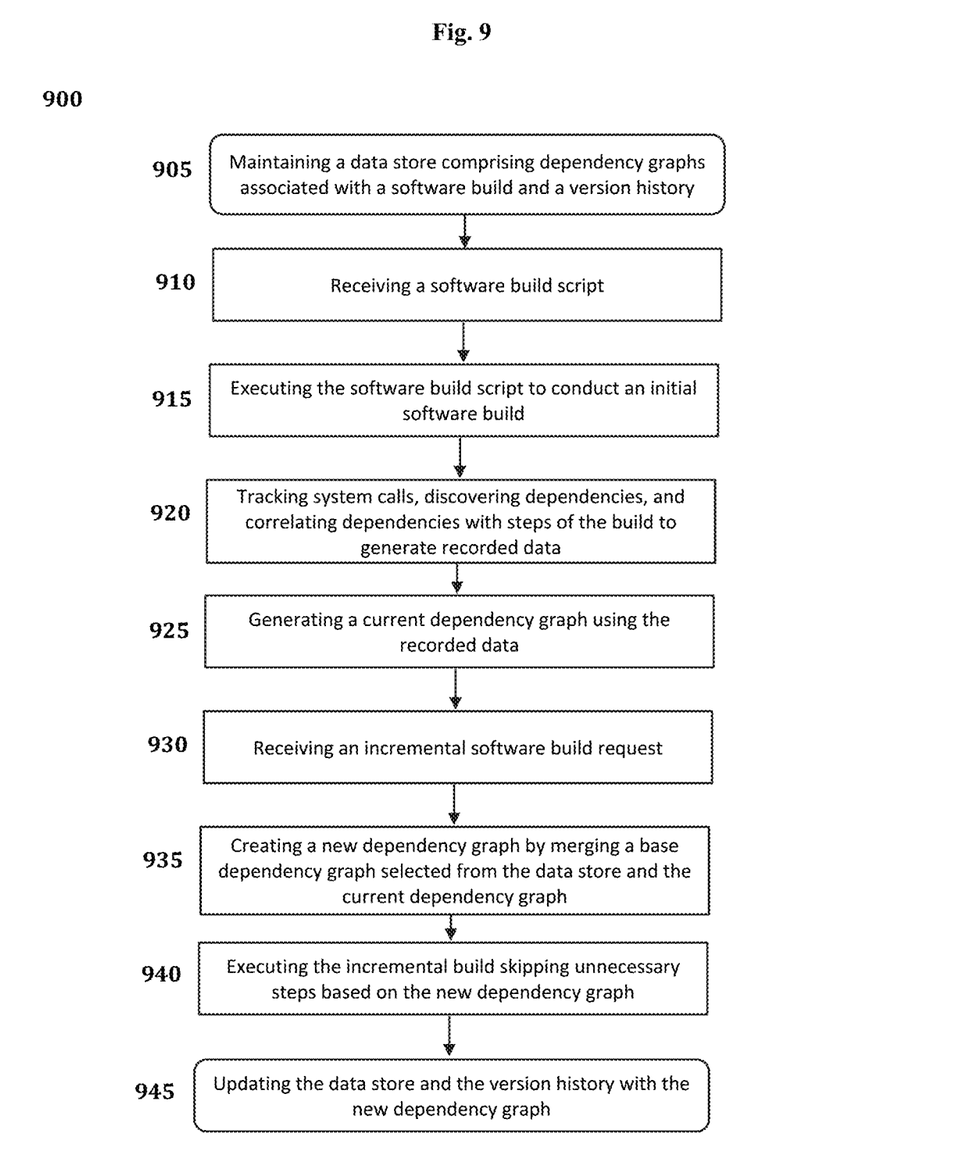
FIG. 9 is a non-limiting example of a process flow diagram; in this case a process flow diagram illustrating a process for running automated software tests executed by a build server.

Referring to FIG. 9, in a particular embodiment, a process 900, executed by one or more build servers, for running automated software tests is provided. In this example process, a data store is maintained 905, wherein the data store comprises a plurality of dependency graphs associated with a software build as well as a version history. First, a software build script is received at the build server 910 and the software build script is executed 915 to conduct an initial software build. Second, during the initial software build, system calls are tracked, dependencies are discovered based on resources accessed by system calls, and the dependencies are correlated with steps of the initial software build to generate recorded data 920. Third, a current dependency graph is automatically generated using at least the recorded data 925. This example process continues when an incremental software build request is received at the build server 930. Next, a new dependency graph is created by merging a base dependency graph selected from the data store and the current dependency graph 935. The incremental software build is then executed, skipping unnecessary steps based on at least the new dependency graph 940. Finally, the data store and the version history are updated with the new dependency graph 945.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, and the like.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 8:
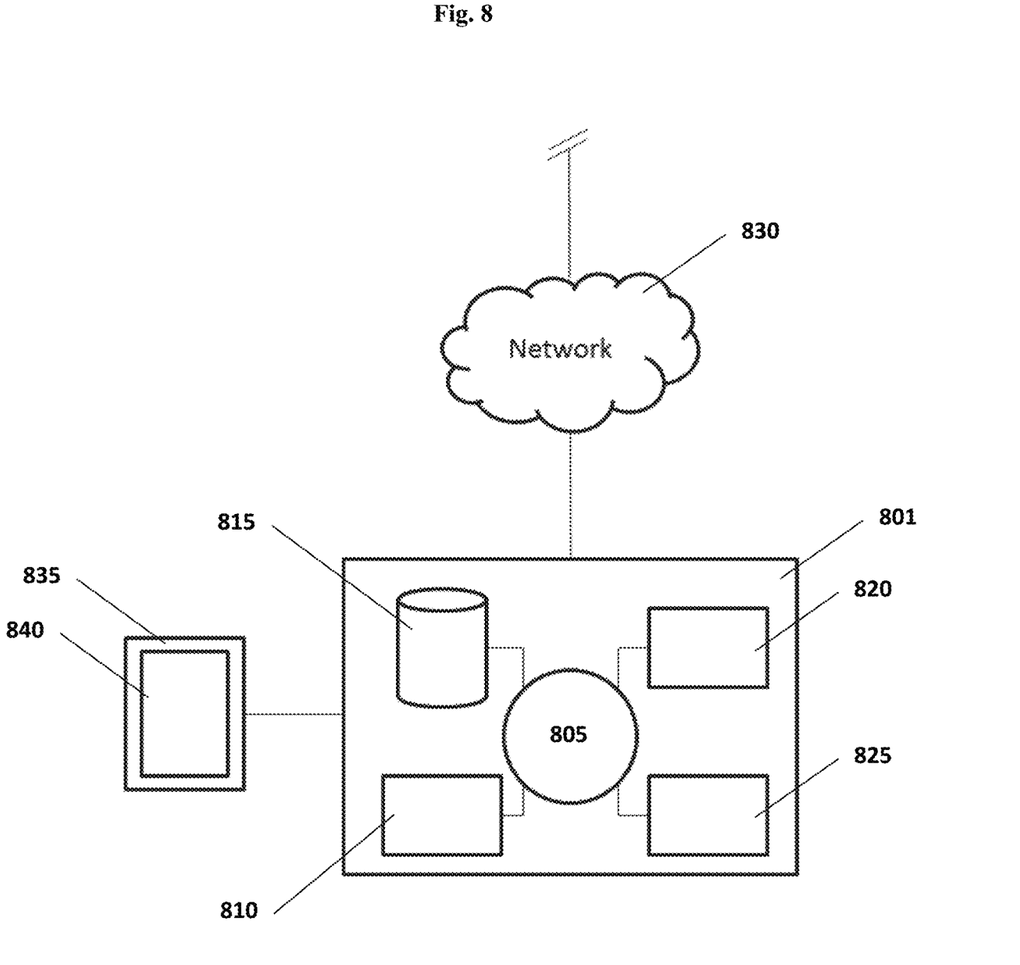
FIG. 8 shows a non-limiting example of a digital processing device; in this case, a device with one or more CPUs, a memory, a communication interface, and a display.

Referring to FIG. 8, in a particular embodiment, an exemplary digital processing device 801 is programmed or otherwise configured to run automated software tests. In this embodiment, the digital processing device 801 includes a central processing unit (CPU, also "processor" and "computer processor" herein) 805, which can be a single core or multi core processor, or a plurality of processors for parallel processing. The digital processing device 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 can be a data storage unit (or data repository) for storing data. The digital processing device 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the device 801, can implement a peer-to-peer network, which may enable devices coupled to the device 801 to behave as a client or a server.

Continuing to refer to FIG. 8, the CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and write back. The CPU 805 can be part of a circuit, such as an integrated circuit. One or more other components of the device 801 can be included in the circuit. In some cases, the circuit is an application specific integrated circuit (ASIC) or a field programmable gate array (FPGA).

Continuing to refer to FIG. 8, the storage unit 815 can store files, such as drivers, libraries and saved programs. The storage unit 815 can store user data, e.g., user preferences and user programs. The digital processing device 801 in some cases can include one or more additional data storage units that are external, such as located on a remote server that is in communication through an intranet or the Internet.

Continuing to refer to FIG. 8, the digital processing device 801 can communicate with one or more remote computer systems through the network 830. For instance, the device 801 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of build/configuration information, build metadata/artifacts/events, and dependency information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—Performance Benchmarking

Figure 7:
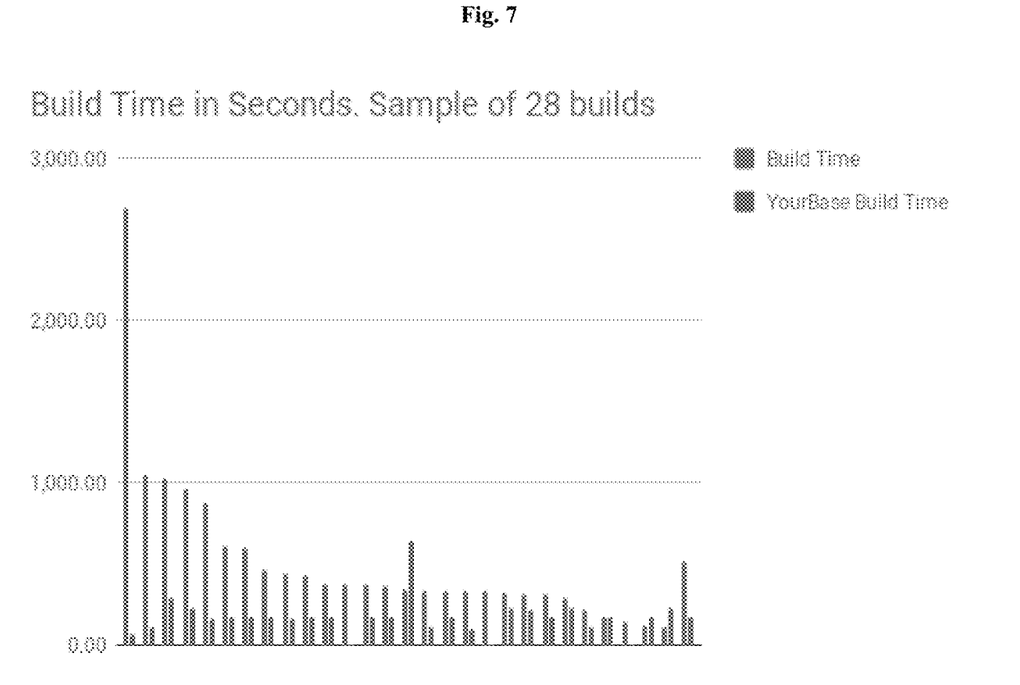
FIG. 7 is a non-limiting example of benchmark results showing reduction in build time by using this invention.

FIG. 7 shows exemplary results of performance benchmark testing demonstrating the possible performance gains to be expected when YourBase is used to run incremental builds for a team. The graph of FIG. 7 shows 28 recent builds and compares their timing between an existing CI system such as Travis with the speed that can be achieved with YourBase and selective step skipping. In that example, YourBase builds would be 3× faster, from 8.6 to 2.9 minutes. 10% of the YourBase builds could be slower because this particular embodiment had a slow database startup process. 90% of the YourBase builds would be faster than in the control group. That is primarily because of test selection and filtering. 10% of the YourBase builds would be instant. That is when people update documentation or dev-only scripts, for example.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented system comprising a digital processing device comprising at least one processor, an operating system configured to perform executable instructions, a memory, and a computer program including instructions executable by the digital processing device to create a software build configured to run automated tests comprising:
   a) maintaining a data store comprising a plurality of dependency graphs associated with the software build and a version history;
   b) a software module receiving a software build script;
   c) a software module executing the software build script to conduct an initial software build;
   d) a software module tracking system calls during the initial software build, discovering dependencies based on resources accessed by the system calls, and correlating dependencies with steps of the initial software build to generate recorded data;
   e) a software module automatically generating a current dependency graph using at least the recorded data;
   f) a software module receiving an incremental software build request;
   g) a software module creating a new dependency graph by merging a base dependency graph selected from the data store and the current dependency graph;
   h) a software module executing the incremental software build skipping unnecessary steps based on at least the new dependency graph; and
   i) a software module updating the data store and the version history with the new dependency graph.

2. The system of claim 1, wherein the recorded data comprises metadata about the initial software build.

3. The system of claim 2, wherein the metadata about the initial software build comprises one or more of: the software being built, the repository being used, the commit identification, and the variables present in the environment.

4. The system of claim 1, wherein the recorded data comprises artifacts of the initial software build.

5. The system of claim 4, wherein the artifacts of the initial software build comprise one or more of: compiled binary code, bundled archives, test results, object files, and generated files.

6. The system of claim 1, wherein the recorded data comprises events that occurred during the initial software build.

7. The system of claim 6, wherein the events that occurred during the initial software build comprises one or more of: files read or modified, sub-processes started, and network resources accessed.

8. The system of claim 1, wherein the recorded data comprises:
   a) metadata about the initial software build;
   b) artifacts of the initial software build; and
   c) events that occurred during the initial software build.

9. The system of claim 1, wherein the software module discovering dependencies discovers the dependencies by inference based on the resources accessed by the system calls.

10. The system of claim 1, wherein the incremental software build is conducted without a user-generated explicit dependency graph.

11. The system of claim 10, wherein the incremental software build is conducted at least 2 times faster than the initial software build.

12. The system of claim 11, wherein the incremental software build is conducted at least 3 times faster than the initial software build.

13. The system of claim 1, wherein the current dependency graph is not manually updated or corrected.

14. A non-transitory computer-readable storage media encoded with a computer program including instructions executable by a processor to create a software build configured to run automated tests comprising:
   a) maintaining a data store comprising a plurality of dependency graphs associated with the software build and a version history;
   b) a software module receiving a software build script;
   c) a software module executing the software build script to conduct an initial software build;
   d) a software module tracking system calls during the initial software build, discovering dependencies based on resources accessed by the system calls, and correlating dependencies with steps of the initial software build to generate recorded data;
   e) a software module automatically generating a current dependency graph using at least the recorded data;
   f) a software module receiving an incremental software build request;
   g) a software module creating a new dependency graph by merging a base dependency graph selected from the data store and the current dependency graph;
   h) a software module executing the incremental software build skipping unnecessary steps based on at least the new dependency graph; and
   i) a software module updating the data store and the version history with the new dependency graph.

15. The storage media of claim 14, wherein the recorded data comprises metadata about the initial software build.

16. The storage media of claim 15, wherein the metadata about the initial software build comprises one or more of: the software being built, the repository being used, the commit identification, and the variables present in the environment.

17. The storage media of claim 14, wherein the recorded data comprises artifacts of the initial software build.

18. The storage media of claim 17, wherein the artifacts of the initial software build comprise one or more of: compiled binary code, bundled archives, test results, object files, and generated files.

19. The storage media of claim 14, wherein the recorded data comprises events that occurred during the initial software build.

20. The storage media of claim 19, wherein the events that occurred during the initial software build comprises one or more of: files read or modified, sub-processes started, and network resources accessed.

21. The storage media of claim 14, wherein the recorded data comprises:
   a) metadata about the initial software build;
   b) artifacts of the initial software build; and
   c) events that occurred during the initial software build.

22. The storage media of claim 14, wherein the software module discovering dependencies discovers the dependencies by inference based on the resources accessed by the system calls.

23. The storage media of claim 14, wherein the incremental software build is conducted without a user-generated explicit dependency graph.

24. The storage media of claim 23, wherein the incremental software build is conducted at least 2 times faster than the initial software build.

25. The storage media of claim 24, wherein the incremental software build is conducted at least 3 times faster than the initial software build.

26. The storage media of claim 14, wherein the current dependency graph is not manually updated or corrected.

27. A computer-implemented method of running automated software tests comprising:
   a) maintaining a data store comprising a plurality of dependency graphs associated with a software build and a version history;
   b) receiving, by a build server, a software build script;
   c) executing, by the build server, the software build script to conduct an initial software build;
   d) tracking, by the build server, system calls during the initial software build, discovering dependencies based on resources accessed by the system calls, and correlating dependencies with steps of the initial software build to generate recorded data;
   e) automatically generating, by the build server, a current dependency graph using at least the recorded data;
   f) receiving, by the build server, an incremental software build request;
   g) creating, by the build server, a new dependency graph by merging a base dependency graph selected from the data store and the current dependency graph;
   h) executing, by the build server, the incremental software build skipping unnecessary steps based on at least the new dependency graph; and
   i) updating, by the build server, the data store and the version history with the new dependency graph.

28. The method of claim 27, wherein the recorded data comprises metadata about the initial software build.

29. The method of claim 28, wherein the metadata about the initial software build comprises one or more of: the software being built, the repository being used, the commit identification, and the variables present in the environment.

30. The method of claim 27, wherein the recorded data comprises artifacts of the initial software build.

31. The method of claim 30, wherein the artifacts of the initial software build comprise one or more of: compiled binary code, bundled archives, test results, object files, and generated files.

32. The method of claim 27, wherein the recorded data comprises events that occurred during the initial software build.

33. The method of claim 32, wherein the events that occurred during the initial software build comprises one or more of: files read or modified, sub-processes started, and network resources accessed.

34. The method of claim 27, wherein the recorded data comprises:
   a) metadata about the initial software build;
   b) artifacts of the initial software build; and
   c) events that occurred during the initial software build.

35. The method of claim 27, wherein discovering dependencies comprises inferring the dependencies based on the resources accessed by the system calls.

36. The method of claim 27, wherein the incremental software build is conducted without a user-generated explicit dependency graph.

37. The method of claim 36, wherein the incremental software build is conducted at least 2 times, at least 3 times, at least 5 times, or at least 10 times faster than the initial software build.

38. The method of claim 27, wherein the current dependency graph is not manually updated or corrected.

* * * * *